United States Patent
Perkins et al.

[11] Patent Number: 5,717,464
[45] Date of Patent: Feb. 10, 1998

[54] RATE CONTROL FOR A VIDEO ENCODER

[75] Inventors: Michael Perkins, Louisville, Colo.; David Arnstein, Fremont, Calif.

[73] Assignee: Divicom, Inc., Milpitas, Calif.

[21] Appl. No.: 573,933

[22] Filed: Dec. 18, 1995

[51] Int. Cl.$^6$ ............................................. H04N 7/36
[52] U.S. Cl. ................................... 348/419; 348/409
[58] Field of Search ........................... 348/405, 419, 348/409, 401, 412, 415; 382/251

[56] References Cited

U.S. PATENT DOCUMENTS 5,231,484  7/1993  Gonzales et al. ............... 348/405
5,452,103  9/1995  Brusewitz ....................... 348/419
5,543,844  8/1996  Mita et al. ....................... 348/405

*Primary Examiner*—Amelia Au
*Attorney, Agent, or Firm*—Meltzer, Lippe, Goldstein, Wolf & Schlissel, P.C.

[57] ABSTRACT

Successive frames in a video sequence are encoded by a video encoder. The bits are apportioned among successive frames to maximize overall perceived video quality when the encoded video sequence is decoded and displayed. The ongoing allocation process is constrained by the need to avoid decoder buffer exception, i.e., buffer underflow and overflow conditions, at the decoder.

14 Claims, 2 Drawing Sheets

RATE CONTROL FOR A VIDEO ENCODER

FIELD OF THE INVENTION

The present invention relates to the use of an encoder to encode video images. Specifically, the present invention relates to the allocation of bits by a video encoder to encode successive frames in a video sequence. The bits are apportioned among successive frames to maximize overall perceived video quality when the encoded video sequence is decoded and displayed. The ongoing allocation process is constrained by the need to avoid decoder buffer exceptions, i.e., buffer underflow or overflow conditions, at the decoder.

BACKGROUND OF THE INVENTION

A video encoder system 10 is illustrated in FIG. 1. The system 10 includes a source of video 12, a preprocessor 14, a video encoder 16, a rate buffer 18 and a controller 20. The source 12 of video is, for example, a video camera, or a telecine machine which converts a sequence of film images into a sequence of video frames, or other device which outputs a sequence of video frames. The preprocessor 14 performs a variety of functions to place the sequence of video frames into a format in which the frames can be compressed by the encoder. For example, in case the video source is a telecine machine which outputs 30 frames per second, the preprocessor converts the video signal into 24 frames per second for compression in the encoder 16 by detecting and eliminating duplicate fields produced by the telecine machine. In addition, the preprocessor may spatially scale each frame of the source video so that is has a format which meets the parameter ranges specified by the encoder 16.

The video encoder 16 is preferably an encoder which utilizes a video compression algorithm to provide an MPEG-2 compatible bit stream. The MPEG-2 bit stream has six layers of syntax. There are a sequence layer (random access unit, context), Group of Pictures layer (random access unit, video coding), picture layer (primary coding layer), slice layer (resychronization unit), macroblock (motion compensation unit), and block layer (DCT unit). A group of pictures (GOP) is a set of frames which starts with an I-frame and includes a certain number of P and B frames. The number of frames in a GOP may be fixed.

The encoder distinguishes between three kinds of frames, (i.e., pictures) I, P, and B. The coding of I frames results in the most bits. In an I-frame, each macroblock is coded as follows. Each 8×8 block of pixels in a macroblock undergoes a DCT transform to form an 8×8 array of transform coefficients. The transform coefficients are then quantized with a variable quantizer matrix. The resulting quantized DCT coefficients are zig-zag scanned to form a sequence of DCT coefficients. The DCT coefficients are then organized into run, level pairs. The run, level pairs are then entropy encoded. In an I-frame, each macroblock is encoded according to this technique.

In a P-frame, a decision is made to code the macroblock as an I macroblock, which is then encoded according to the technique described above, or to code the macroblock as a P macroblock. For each P macroblock, a prediction of the macroblock in a previous video frame is obtained. The prediction is identified by a motion vector which indicates the translation between the macroblock to be coded in the current frame and its prediction in the previous frame. (A variety of block matching algorithms can be used to find the particular macroblock in the previous frame which is the best match with the macroblock to be coded in the current frame. This "best match" macroblock becomes the prediction for the current macroblock.) The predictive error between the predictive macroblock and the current macroblock is then coded using the DCT, quantization, zig-zag scanning, run, level pair encoding, and entropy encoding.

In the coding of a B-frame, a decision has to be made as to the coding of each macroblock. The choices are (a) intracoding (as in an I macroblock), (b) unidirectional backward predictive coding using a subsequent frame to obtain a motion compensated prediction, (c) unidirectional forward predictive coding using a previous frame to obtain a motion compensated prediction, and (d) bidirectional predictive coding wherein a motion compensated prediction is obtained by interpolating a backward motion compensated prediction and a forward motion compensated prediction. In the cases of forward, backward, and bidirectional motion compensated prediction, the predictive error is encoded using DCT, quantization, zig-zag scanning, run, level pair encoding, and entropy encoding.

B frames have the smallest number of bits when encoded, then P frames, with I frames having the most bits when encoded. Thus, the greatest degree of compression is achieved for B frames. For each of the I, B, and P frames, the number of bits resulting from the encoding process can be controlled by controlling the quantizer step size. A macroblock of pixels or pixel errors which is coded using a large quantizer step size results in fewer bits than if a smaller quantizer step size is used.

After encoding by the video encoder, the bit stream is stored in the encoder rate buffer 18. Then, the encoded bits are transmitted via a channel 21 to a decoder, where the encoded bits are received in a buffer of the decoder.

A decoder system 30 is shown in FIG. 2. An encoded video bit stream arrives via the transmission channel 21 and is stored in the decoder buffer 32. The size of the decoder buffer 32 is specified in the MPEG-2 specification. The encoded video is decoded by the video decoder 34 which is preferably an MPEG-2 compliant decoder. The decoded video sequence is then displayed using the display 36.

The purpose of rate control is to maximize the perceived quality of the encoded video sequence when it is decoded at a decoder by intelligently allocating the number of bits used to encode each frame. The sequence of bit allocations to successive frames preferably ensures that an assigned channel bit rate is maintained and that decoder buffer exceptions (overflow or underflow) are avoided. The allocation process takes into account the frame type (I, P or B) and scene dependent coding complexity. To accomplish rate control at the encoder, the controller 20 receives input information indicating the occupancy of the rate buffer 18. The controller 20 executes a rate control algorithm and feeds back control signals to the encoder 16 (and possibly to the preprocessor 14, as well) to control the number of bits generated by the encoder for succeeding frames.

The rate control algorithm executed by the controller 20 controls the encoder 16 by controlling the overall number of bits allocated to each frame. (Rate control generally does not deal with the issue of allocating bits to individual macroblocks within a frame.) The controller allocates bits to successive frames to be encoded in the future so that the occupancy of the encoder rate buffer 18 is controlled thereby preventing exceptions at the decoder buffer 32. The predicted occupancy of the encoder buffer at any time depends on the number of bits allocated for encoding the frames and the predicted number of bits removed from the encoder buffer via the transmission channel.

One conventional rate control algorithm is the MPEG-2 Test Model (TM). The TM rate control is designed to expend a fixed average number of bits per group of pictures (GOP). If too many bits are spent on one GOP, then the excess will be remedied by allocating fewer bits to the next GOP.

From the perspective of encoder buffer occupancy, the TM rate control attempts to force the encoder rate buffer occupancy to the same level at the beginning of each GOP. FIG. 3 shows the rate buffer trajectory for the TM rate control. The term "buffer trajectory" refers to a time series of buffer occupancy values sampled once per video frame. Note that the encoder rate buffer occupancy level is pulled to a predetermined level periodically at the beginning of a GOP. Illustratively, in FIG. 3, each GOP has fifteen frames. The controller receives an indication of actual buffer occupancy from the encoder rate buffer and allocates bits to the succeeding frames such that the desired buffer occupancy is predicted to occur at the end of the GOP. This often means that only a relatively small number of bits can be allocated to code frames which occur near the end of a GOP. To make the bit allocations, the controller 20 assumes that all frames of same type (I, P or B) have the same number of bits.

The actual number of bits used by the encoder 16 to code a frame generally differs from the number of bits allocated by the controller 20. The deviation may be small or may be large, if, for example, there is a scene change and predictive coding cannot be used. The bit allocations provided by the controller for a set of frames are viewed by the encoder as targets which are updated frequently rather than hard and fast requirements. For example, an encoder may respond to an allocation by the controller by increasing or decreasing a quantization step size to increase or decrease the number of encoded bits for a frame. After each particular frame is actually encoded, the allocations for succeeding frames are updated by the controller, based on how many bits are actually used to encode the particular frame.

The TM rate control technique has several shortcomings. First, there is no explicit mechanism for avoiding decoder buffer exceptions. Moreover, the rapid pulling of the buffer occupancy to a predetermined level near the end of a GOP serves to penalize the frames near the end of a GOP. This is especially deleterious if there is an event in the video sequence which requires a large number of bits because predictive coding from previous frames cannot be used. Such events which can require a relatively large number of bits include scene changes and the splicing of a commercial into a 3:2 pull down sequence derived from a film.

It is an object of the present invention to provide a rate control algorithm for a video encoder which overcomes the problems described above.

SUMMARY OF THE INVENTION

The present invention relates to a method for encoding a sequence of video frames using an encoder system comprising a video encoder, a rate buffer, and controller. In accordance with a rate control algorithm of the present invention, an encoder buffer trajectory is predicted in a prediction window which is several GOPs long. The inventive rate control algorithm uses a simple model of the actual encoding process to make this prediction. In particular, it assumes that each frame type (I, P or B) uses a different number of bits, but all frames of the same type use the same number of bits. The inventive rate control algorithm causes the predicted buffer occupancy at the end of the prediction window to be a target value near zero. Heuristically, this means that the maximum head room is created in the encoder buffer for the bits of subsequent GOPs.

The inventive rate control algorithm does not attempt to drive the buffer occupancy to the same point at the end of every GOP. For example, a GOP containing a scene cut will not cause the immediately succeeding GOP to compensate for all the excess bits it used; the excess usage will be compensated over several subsequent GOPs. In comparison to the TM rate control algorithm, the inventive rate control algorithm provides a noticeable increase in video quality when coding scenes whose coding complexity changes rapidly.

The inventive rate control algorithm prevents buffer exceptions (overflow and underflow) of the decoder buffer. This is accomplished indirectly by imposing a lower limit and upper limit on the encoder buffer fullness, and by requiring the inventive rate control algorithm to enforce these limits.

It is a significant advantage of the rate allocation algorithm of the invention that it explicitly prevents decoder buffer exceptions. The TM rate control algorithm does not do this.

DETAILED DESCRIPTION OF THE INVENTION

Figure 1:
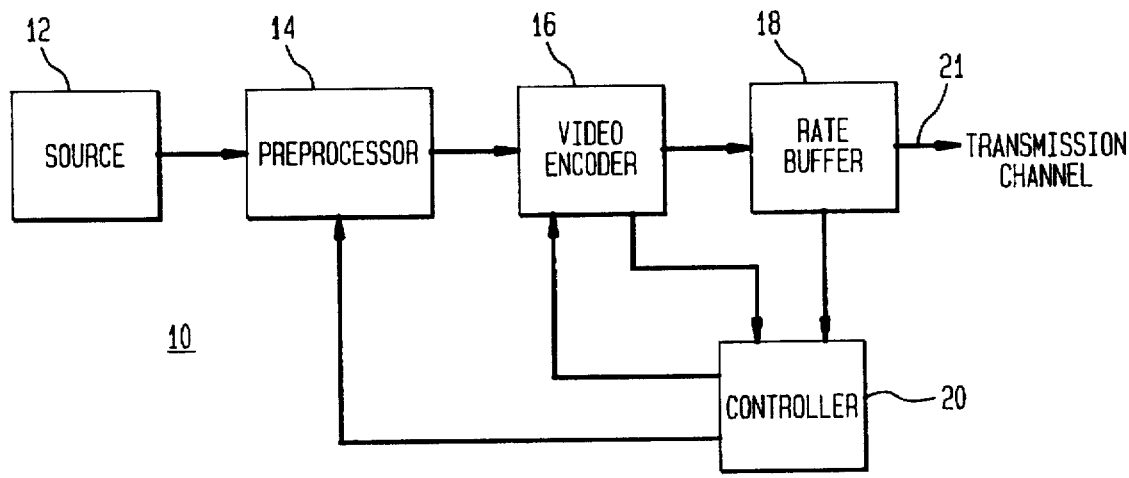
FIG. 1 schematically illustrates a conventional video encoder system.
Figure 2:
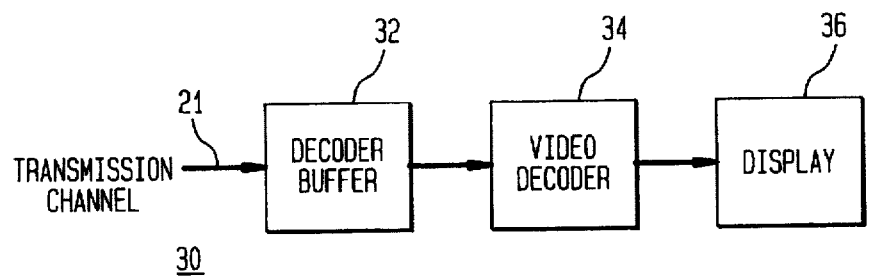
FIG. 2 schematically illustrates a conventional video decoder system.
Figure 3:
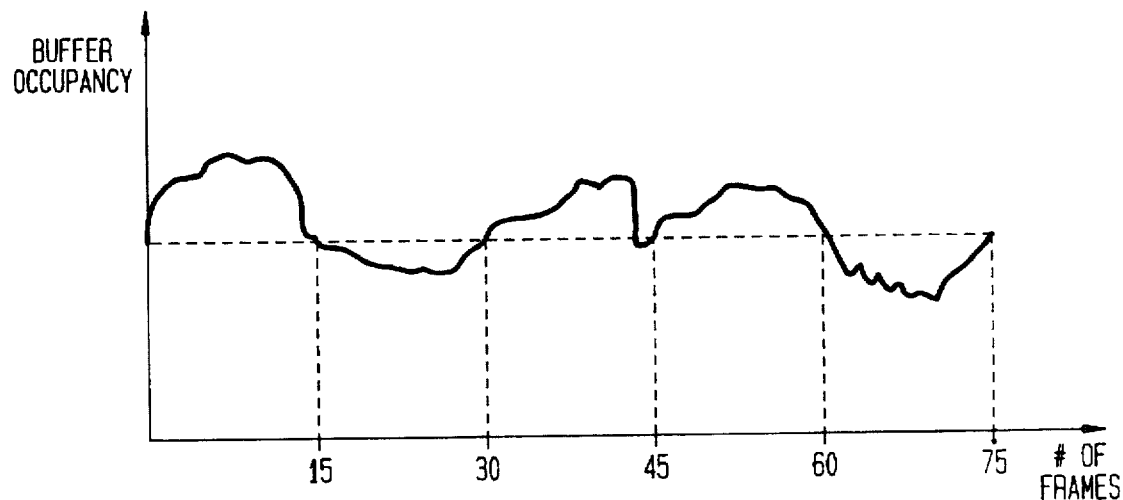
FIG. 3 illustrates a rate buffer trajectory for a conventional MPEG-2 test model rate control algorithm.

In accordance with an illustrative embodiment of the invention, a rate control algorithm for a video encoder predicts an encoder rate buffer trajectory in a prediction window several GOPs long. The inventive rate control algorithm is carried out in an encoding system comprising a video encoder, a rate buffer, and a controller which controls the video encoder.

Preferably, the prediction window ends just before an I-frame. The inventive algorithm uses a simple model of the encoding process to make this prediction. In particular, the inventive algorithm assumes that each frame type (I, P or B) uses a different number of bits, but all frames of the same type use the same number of bits.

The inventive rate control algorithm causes the predicted encoder buffer occupancy at the end of the prediction window to converge towards a target value (floor parameter) near zero. Illustratively, the floor parameter is about 350,000 bits. By using the floor parameter, maximum head room is created in the rate buffer for subsequent GOPs.

In accordance with the inventive rate control algorithm, the same number of bits are allocated to frames of the same type. Let $T_Y$ equal the number of bits to be allocated to frames of type Y, where Y=I, P or B. Then there exist ratios $C_I$ and $C_P$ and such that the overall picture quality is maximized when $$T_I = C_I T_B \qquad \text{EQ (1)}$$

$$T_P = C_P T_B$$

The ratios $C_I$ and $C_P$ are computed by the controller according to the inventive rate control algorithm. If the quantizer matrices specified by the MPEG-2 Test Model are used, then $$C_I = 1.4 \frac{X_I}{X_B} \quad \text{EQ. (2)}$$

$$C_P = 1.0 \frac{X_P}{X_B}$$

If other quantization matrices are used, then the constants 1.4 and 1.0 appearing in Equation 2 will change. Here, $X_I$, $X_P$, and $X_B$ are actively measures, each of which is the product of the number of bits B actually used to code a frame and a measure of scene complexity Q (average QSCALE), where QSCALE is a quantization matrix scaling factor.

$$X_Y = B_Y Q_Y \quad Y = I, P, B \quad \text{EQ (3)}$$

The inventive rate control algorithm is used by the controller to determine a value for $T_B$ and a corresponding predicted encoder buffer trajectory within a prediction window prior to the actual encoding of each current frame to be encoded. For each successive current frame to be encoded, the value of $T_B$ and the corresponding predicted encoder buffer trajectory is recomputed. The prediction window is a moving window which changes for each current frame to be encoded. This prediction window always ends with an I-frame, at the precise time just before the (large number of) bits which compose this I-frame enter the encoder buffer. Thus, there is some variability in the size of the prediction window. The algorithm specifies a minimum number of GOPs for the prediction window, e.g., four GOPs for the prediction window. The prediction window can be as long as five GOPs, minus one frame.

To begin the computation of a predicted encoder buffer trajectory associated with a particular current frame to be encoded, the controller receives the actual buffer occupancy from the encoder buffer. At each frame in the prediction window, the controller executes the following steps:

1. The controller adds a number of bits to the encoder buffer occupancy. (How to determine the number of bits to add to the encoder occupancy for each frame in the prediction window is discussed below.) This number represents bits that would enter the encoder buffer if the frame were to be encoded with the allocated bits.
2. The controller then checks for encoder buffer overflow by comparing the increased buffer occupancy with a ceiling parameter.
3. The controller subtracts a number of bits from the encoder buffer occupancy. This number represents bits leaving the encoder buffer, to be transmitted via a transmission channel to the decoder buffer. (This number depends on the bit rate of the transmission channel and the duration of a frame).
4. The controller checks for encoder buffer underflow by comparing the now reduced buffer occupancy with a floor parameter.

In a preferred embodiment of the invention, the order of these four operations is not entirely arbitrary, it helps guarantee decoder buffer stability.

As used herein "encoder buffer overflow" means that the occupancy of the encoder buffer exceeds a predetermined upper limit ("ceiling parameter"). As used herein "encoder buffer underflow" means the occupancy of the encoder buffer falls below a predetermined lower limit (floor parameter). When these constraints are imposed on the encoder buffer occupancy, exceptions at the decoder buffer are prevented. The use of a ceiling parameter less than the decoder buffer size, and a floor parameter greater than zero creates guard zones in the buffer occupancy sufficient to accommodate the inability of the rate control to generate exactly the requested number of bits.

The number of bits subtracted in step three is the ratio of the channel bitrate to the number of frames per second for the video standard being supported. The situation is more complicated when inverse telecine operation is in effect, since the number of frames per second can instantaneously alternate between 24 to 30. In this case, the buffer trajectories will be affected because the frames vary in duration, and the number of bits removed from an encoder in a frame time will also vary. The buffer trajectory will also be affected if the channel bitrate assigned to the encoder varies. This can happen if a plurality of channels are statistically multiplexed.

An iterative algorithm is used to determine how many bits to allocate to each frame that is being predicted in the prediction window (in other words, an iterative algorithm is used to compute $T_B$). This algorithm is as follows:

1. Guess value for $T_B$. Compute $T_P$ and $T_I$ according to Equation 1. Compute a predictive window length so that it ends immediately before an I-frame.
2. Using the bit allocations from step 1, compute the buffer trajectory for the prediction window.
3. Decide whether to increase or decrease $T_B$. The method of bisection is used to converge on a target "floor" value of $T_B$ that leaves the encoder buffer relatively empty at the end of the prediction window:
   If the first buffer exception to occur was an overflow, decrease $T_B$.
   If the first buffer exception to occur was an underflow, increase $T_B$.
   If no buffer exception occurred, and the final buffer fullness is below the floor parameter, increase $T_B$.
   If no buffer exception occurred, and the final buffer fullness is above the floor parameter, decrease $T_B$.
   Stop iterating when the change in $T_B$ drops below some threshold amount. Now that $T_B$ is determined, the number of bits allocated to each frame in the prediction window can be determined because each frame of a particular type B, P or I is allocated the same number of bits $T_B$, $T_P = C_P T_B$, or $T_I = C_I T_B$. In addition, the sequence of I, P, and B frames in a GOP is known. Thus, it is known how many bits will be added to the encoder occupancy buffer for each frame in the prediction window.
4. The encoder then transmits the encoder information ($T_B$, $T_P$, or $T_I$) which tells the encoder how may bits are allocated for the current frame to be encoded. The encoder then encodes the current frame and the actual encoded bits, which may differ in number from the allocation, are added to the encoder buffer. The $C_Y$ values defined in the previous section are then updated and the entire algorithm is repeated for the next current frame.

In step 3, a "floor parameter" was referenced. Using simulations, it has been determined that a value of 350,000 bits performed well. The ceiling parameter used to determine if there is an overflow at the encoder buffer is determined by setting the ceiling equal to 0.95% of the decoder buffer size.

The rate control algorithm executed by the encoder controller may be summarized as follows:

(a) For each current frame to be encoded, a prediction window is determined. The prediction window is a minimum number of GOPs in length and ends in an I-frame.

(b) For each frame in the prediction window, there is allocated a number of bits. The number of bits for each frame is determined by the frame type and by $T_B$ according to EQ (1).

(c) Then, for each frame in the prediction window, the controller increases the encoder buffer occupancy by adding the number of bits allocated for that frame, checks for encoder buffer overflow, subtracts from the encoder buffer occupancy the number of bits leaving the encoder buffer in the frame time via the transmission channel, and checks for encoder buffer underflow. In this way, the predicted encoder buffer occupancy for each frame time in the prediction window is determined. Thus, it is possible to determine the predicted encoder buffer trajectory.

(d) An iterative or single step analytic process is used to determine $T_B$. In the iterative process, the value of $T_B$ is varied iteratively until the buffer trajectory converges on a floor parameter at the end of the prediction window. If $T_B$ is too large, the trajectory will be above the floor parameter and there may be overflow, if $T_B$ is too small, the trajectory will be below the floor parameter and there may be underflow.

(e) Then, the current frame is encoded by the encoder. Based on the number of bits actually used to encode the current frame, $C_I$ and $C_P$ (see eq (1), (2) and (3)) are updated.

(f) Now, for the next current frame, the steps (a) through (e) are repeated.

Figure 4:
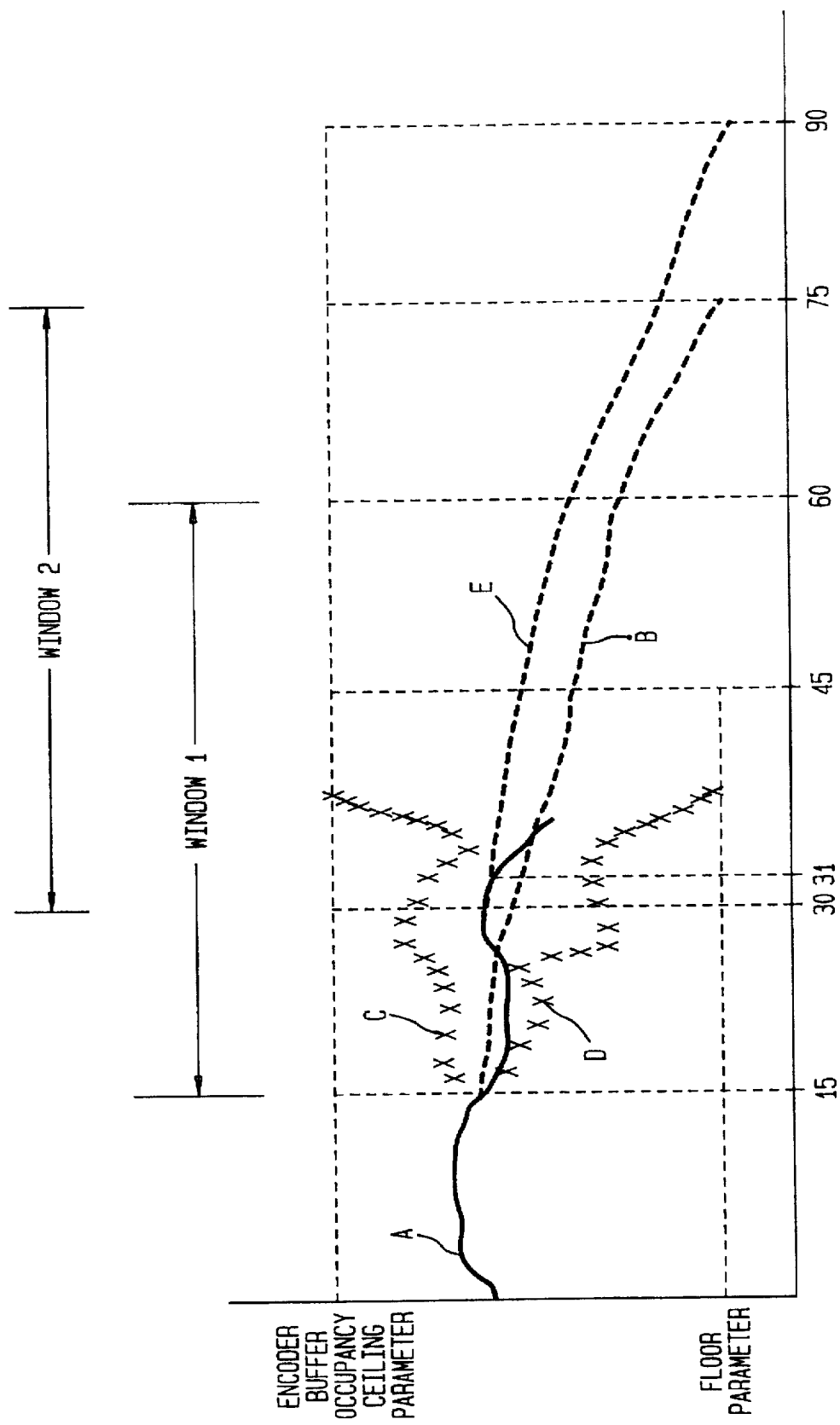
FIG. 4 illustrates a rate buffer trajectory when a rate control algorithm according to the present invention is utilized.

FIG. 4 illustrates buffer trajectories which are determined according to the invention. The frame number is plotted on the horizontal axis. The frames are divided into GOPs. Each GOP comprises fifteen frames beginning with an I frame and containing a predetermined sequence of B and P frames. The vertical axis is the encoder buffer occupancy. The ceiling parameter and floor parameter are indicated. If the encoder buffer trajectory stays between these limits, there will be no exception at the decoder buffer.

The trajectory A (solid line) is the actual encoder buffer occupancy after the encoding of frames 1 through 35. Trajectory B is the predicted trajectory determined after the encoding of frame 15 and prior to the encoding of frame 16. This prediction is formulated for the prediction window 1. The trajectory B converges to the floor parameter at the end of the prediction window 1. Trajectories C and D are trajectories used in the iterative determination of a final value of $T_B$ for use in determining trajectory B. The intermediate value of $T_B$ corresponding to the trajectory C is too large because trajectory C overflows the encoder buffer (crosses the ceiling parameter). The intermediate value $T_B$ corresponding to trajectory D is too small because the trajectory C overflows the encoder buffer (crosses the floor parameter).

As indicated above, the predicted buffer trajectory is updated after each frame time. The trajectory E is the predicted buffer trajectory determined after the encoding of frame 31. The predicted buffer trajectory E is predicted for the window 2. This trajectory also converges towards the floor parameter.

In short, a unique rate control algorithm for a video encoder has been disclosed. Finally, the above described embodiments of the invention are intended to be illustrative only. Numerous alternative embodiments may be devised by those skilled in the art without departing from the spirit and scope of the following claims.

We claim:

1. A method for encoding a video signal comprising a sequence of frames using an encoder system, said encoder system comprising a video encoder, an encoder buffer, and a controller for controlling the number of bits used by the video encoder to encode each frame, said sequence of frames being divided into groups of pictures (GOPs), each GOP beginning with an I picture and containing a plurality of P and B pictures, said method comprising the steps of:

for each current picture to be encoded by said video encoder, using said controller, allocating a number of bits to each frame in a prediction window including said current frame and a plurality of GOPs following said current frame, the number of bits being allocated to each frame in said prediction window being such that a predicted occupancy of said encoder buffer approaches a floor parameter at the end of said prediction window, coding said current picture based On Said number of bits being allocated to said current frame, and repeating said steps of using and allocating for each successive frame in said sequence.

2. The method of claim 1 wherein said video encoder receives as an input from the controller information indicating the number of bits allocated for each current frame and codes each current frame in response to the number of bits allocated.

3. The method of claim 1 wherein said allocating step comprises allocating a first number of bits to each I-picture in the prediction window, allocating a second number of bits to each P-picture in the prediction window, and allocating a third number of bits to each B-picture in the prediction window, said first, second and third numbers being capable of being varied for each current frame to be encoded.

4. The method of claim 3 wherein said third number of bits is $T_B$, said first number of bits is $C_I T_B$, and said second number of bits is $C_P T_B$, such that $C_I$ and $C_P$ are ratios which depend on a quantizer matrix used by said encoder, and $T_b$ is determined for each current frame to be encoded.

5. A method for encoding a video signal comprising a sequence of frames using an encoder system, said encoder system comprising a video encoder, an encoder buffer, and a controller for controlling the number of bits used by the video encoder to encode each frame, said sequence of frames being divided into groups of pictures (GOPs), each GOP beginning with an I picture and containing a plurality of P and B pictures, said method comprising the steps of:

for each current picture to be encoded by said video encoder, using said controller, allocating a number of bits to each frame including said current frame and a plurality of GOPs following said current frame by:

allocating a first number of bits to each I-picture in a prediction window, allocating a second number of bits to each P-picture in the prediction window, and allocating a third number of bits to each B-picture in the prediction window, wherein said third number of bits is $T_B$, said first number of bits is $C_I T_B$, and said second number of bits is $C_P T_B$, such that $T_B$ is determined for each current frame to be encoded, wherein $C_I = A X_I / X_B$ and $C_P = B X_P . X_B$, wherein A and B are constants which depend on a quantizer matrix used by said encoder, wherein $X_Y=B_YQ_Y$ and Y=I, B, P, and wherein $B_Y$ is the number of bits actually used by the encoder to encode a previous frame of type Y and $Q_Y$ as a measure of scene complexity in a previous frame of type Y, and wherein the number of bits being allocated to each frame in said prediction window being such that a predicted occupancy of said encoder buffer approaches a floor parameter at the end of said prediction window.

6. The method of claim 5 further comprising the step of updating said parameters $C_I$ and $C_P$ prior to said allocating step for each current frame to be encoded.

7. The method of claim 1 further comprising the step of determining a predicted encoder buffer occupancy for each frame in the prediction window.

8. The method of claim 7 wherein said step of determining the predicted encoder buffer occupancy for each frame in the prediction window comprises:

(a) adding the number bits allocated for the frame to a previously obtained value for said encoder buffer occupancy, (b) testing the encoder buffer occupancy to determine if there is encoder buffer overflow, (c) subtracting from the encoder buffer occupancy the number of bits leaving the encoder buffer via a channel, and (d) testing the encoder buffer occupancy to determine if there is encoder buffer underflow.

9. The method of claim 1 wherein said allocating step comprises allocating bits to the frames in said prediction window such that a predicted encoder buffer trajectory for the frames in said prediction window converges at said floor parameter at the end of the prediction window, said predicted buffer trajectory not crossing said floor parameter and not crossing a ceiling parameter.

10. The method of claim 1 wherein said prediction window comprises a minimum number of GOPs and ends at an I picture.

11. The method of claim 4 wherein said value of $T_B$ is determined for each current frame to be encoded, such that a final value of $T_B$ for the current frame to be encoded results in a predicted encoder buffer trajectory which does not overflow or underflow and which converges on a floor parameter at the end of the prediction window.

12. A method for encoding a video signal comprising a sequence of frames divided into Groups of Pictures (GOPs) using an encoder system, said encoder system comprising a video encoder, an encoder buffer for receiving encoded bits from the video encoder, and a controller for controlling said video encoder, said method comprising the steps of:

(a) for one frame in said sequence of frames to be encoded, defining a prediction window including said one frame and having a duration of at least a plurality of GOPs, (b) using said controller, allocating a predicted number of bits to each frame in said prediction window such that a predicted encoder buffer occupancy trajectory does not overflow or underflow and the predicted encoder buffer occupancy trajectory converges towards a floor parameter at the end of the prediction window, (c) coding by said encoder said one frame in said sequence in response to the number of bits allocated to said one frame, and (d) repeating said steps a, b and c for each successive frame in said sequence.

13. The method of claim 12 wherein said frames in said sequence include I-frames, P-frames, and B-frames, and wherein said allocating step comprises allocating each B-frame in said prediction window a first number of bits, allocating each I-frame in said prediction window a second number of bits, and allocating each P-frame in said prediction window a third number of bits.

14. The method in claim 13 wherein said first, second and third numbers are variable for each successive frame in said sequence.

* * * * *